United States Patent [19]
Fitzhugh

[11] 3,762,170
[45] Oct. 2, 1973

[54] IRRIGATION APPARATUS AND METHODS
[76] Inventor: Davis Fitzhugh, Raspberry Ln., Augusta, Ark. 72006
[22] Filed: Apr. 11, 1972
[21] Appl. No.: 243,019

[52] U.S. Cl. ............... 61/13, 137/525.1, 239/350, 239/534
[51] Int. Cl. ..... E02b 13/00, B05b 1/30, F16k 15/00
[58] Field of Search ................. 61/12, 13, 10, 11; 137/525.1, 608, 209; 239/534, 350; 47/40.5

[56] References Cited
UNITED STATES PATENTS

| | | | |
|---|---|---|---|
| 3,518,831 | 7/1970 | Tibbals, Jr. et al. | 61/13 |
| 3,422,844 | 1/1969 | Grise | 137/525.1 |
| 3,490,482 | 1/1970 | Sachs et al. | 137/209 X |
| 3,461,675 | 8/1969 | Izatt | 61/13 X |
| 3,546,884 | 12/1970 | Timpe | 61/13 |

Primary Examiner—Jacob Shapiro
Attorney—Hubert T. Mandeville et al.

[57] ABSTRACT

Methods and apparatus are provided for above-surface or preferably sub-surface drip irrigation of areas of land of different sizes, and in a manner in which individual increments of water can be expelled in controlled amounts into the soil along a supply line for effective irrigation simultaneously with a substantial reduction in the total quantity of water used in comparison with prior arrangements for the same amount of land. Also included are means for the sequential activation of the system to provide for any number of controlled expellations during a time period. In addition, provision is made for expelling the same quantity of water at each point along the system regardless of the terrain of the land being irrigated and in the absence of the need for expensive land levelling procedures. The methods and apparatus herein are especially appropriate for use with manually operated control equipment in undeveloped areas.

11 Claims, 10 Drawing Figures

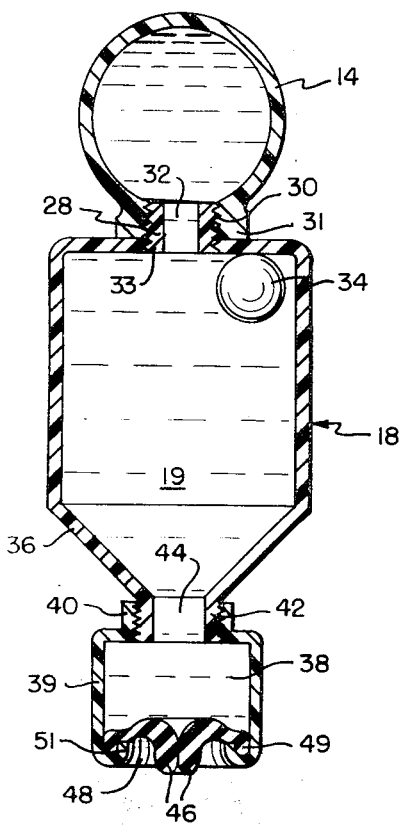
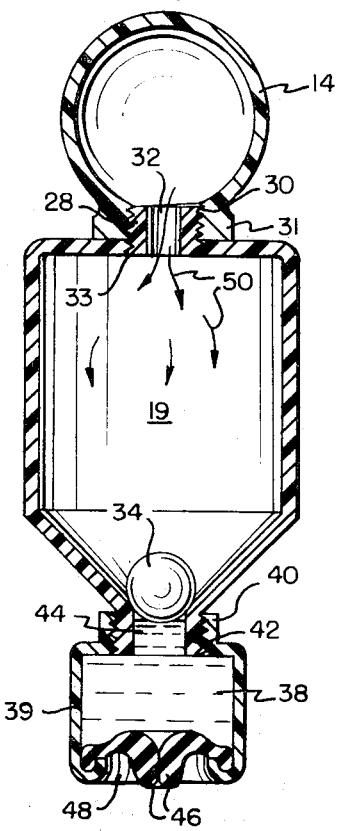
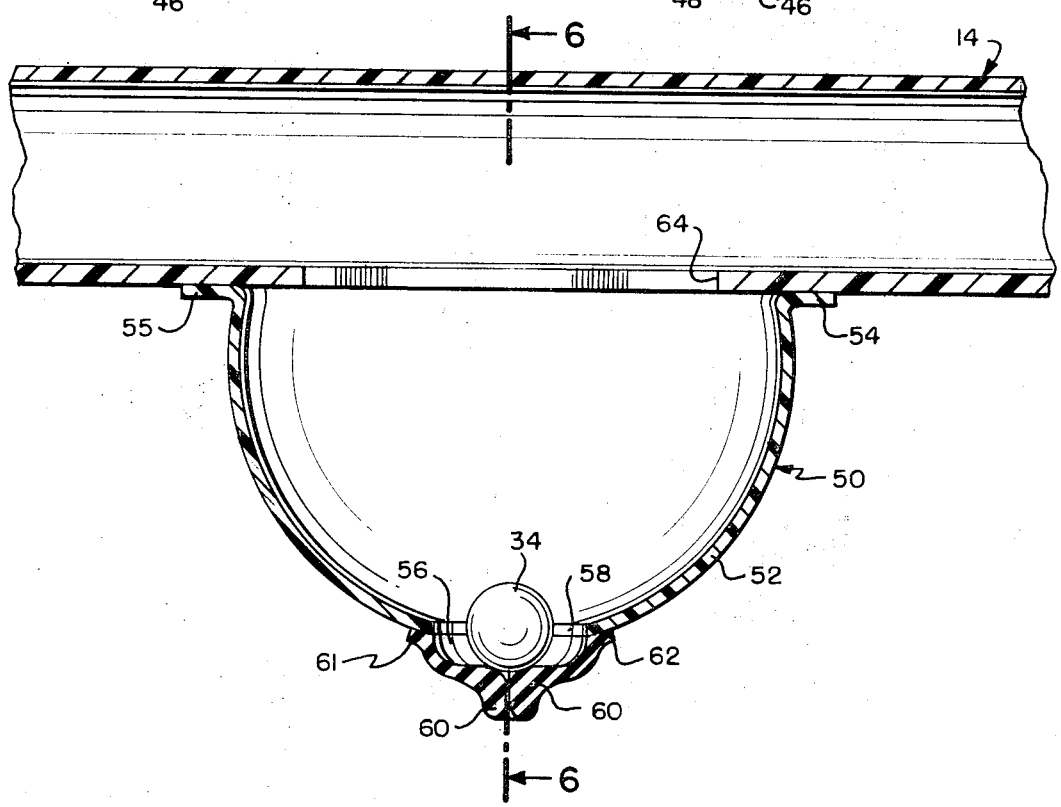

IRRIGATION APPARATUS AND METHODS

This invention relates generally to drip-type irrigation of land. More particularly, this invention relates to methods and apparatus for drip irrigation of land, preferably by sub-surface application, in which the water can be applied in predetermined measured quantities and with each small increment along the supply line of water being substantially equal to every other increment, regardless of how close the position is from the source of supply of the water, and (within limits) without regard to the terrain of the land.

Drip irrigation has become increasingly popular in the last few years. The development has been more rapid recently because of the increasing shortage of water in many areas. Drip irrigation, as the name implies, applies very small quantities of water more or less continuously to the soil being irrigated, in contrast to the more conventional ditch type irrigation methods in which ditches are arranged along rows of plants to be watered and periodically flooded to feed the roots of plants adjacent to the ditches. Drip irrigation is particularly effective when it is applied below the soil because much smaller quantities of water can be utilized for irrigating the same amount of land, because it avoids evaporation. And this is particularly important in arid areas where evaporation takes place rapidly. In addition, because there is an absence of evaporation, salt deposits do not accumulate in the areas adjacent to the root structure of the plants being irrigated, which problem necessitated, in the past, periodic flushing in order to remove the salt deposits.

As was stated above, in drip irrigation, the water is applied in very small quantities more or less continuously. In this manner, the soil is kept in a "substantially moist" condition in a continuous manner so that water is constantly available for the roots of plants being irrigated. This is so, even though the surface appearance may look dry. One advantage of drip irrigation over the more conventional ditch type is the fact that the soil adjacent to plants is more or less continuously dry on the surface, and, therefore, the planter or farmer can operate heavy duty servicing equipment such as sprayers along the rows of the plants without being mired in mud or without having to follow a particular schedule between the times when those areas would ordinarily be flooded in ditch irrigation. Furthermore, with this comparatively dry condition of the soil adjacent to plants, manual pickers can go along the plants without the usual difficulties engendered if the soil is in a muddy condition.

A variety of different methods and apparatus have been utilized by drip irrigation including the use of porous wall tubing with the water outlets being located throughout the entire hose wall for continuous wetting, as long as the hose is supplied with water. Other developments include a variety of different kinds of valves or water emitters placed sequentially in spaced apart relation along the supply tube or hose, with these valves being arranged so as to emit water to the soil while simultaneously providing for anti-clogging of the valve orifice from dirt particles adjacent to the orifice.

Certain difficulties arise from these various prior arrangements in that they all provide for substantially continuous feeding of the soil with water as long as the supply line is supplied with water. Thus, control of the amount of water desired for any particular plant involves control of the outlet orifice or of the various valves involved. Generally, therefore, these orifices are very small and within the range of 0.015 inches to 0.020 inches in diameter. Because of these very small orifices and because the valves connected to them are very small there are substantial problems of clogging. As a result, most of the configurations of the various valves developed have to do with flusing them out and protecting them from such clogging characteristics.

Other disadvantages of these continuous flow type arrangements with a plurality of spaced apart valves or orifices along the supply line include the fact that if the terrain is not completely level there is wide variation in the amount of water fed to that portion of the land having higher elevations from that portion of the land having lower elevations. Alternately, expensive land leveling procedures must be used.

Certain other developments have been made to overcome these various difficulties including the use of a twin wall structure which is in essence a hose within a hose. This two chamber hose combines in high-pressure internal hose having widely spaced outlets feeding into the outer hose which is under lower pressure and which has relatively larger orifices at closely spaced intervals for feeding the soil. This combination reduces flow variations to some extent due to friction loss and variations in elevation, and because of the low pressure outer hose, larger orifices can be used which reduce to a certain extent the problem of clogging.

However, with this system, as well as the others discussed above, there is still a continuous feeding of substantially uncontrolled amounts of water as long as the supply line is fed with water. That is, as long as the system is turned on, water is being fed continuously with control depending solely on the size of the orifice through which the water is fed to the soil.

By contrast, and quite unexpectedly, it has now been found in accordance with this invention that predetermined controlled metered amounts of water can be fed to the soil either above the surface thereof or in sub-surface fashion, and in a manner whereby substantially the same amount of water will be fed to the soil at every outlet along the supply line with only limited regard for the terrain of the land being fed and with greatly reduced fluctuations due to frictional effects. With the arrangement herein, the planter or farmer can first determine the quantity of water to be fed to the soil at each outlet along the supply line and then can determine the time intervals between each feeding of the soil of the controlled amounts of water first predetermined. With such control, extraordinarily small amounts of water will suffice for appropriate and effective irrigation of the roots of plants involved. Obviously, with such control, plants requiring different amounts of water will be fed the desired amount and in the proper intervals of time in order to maintain the soil around the roots of the plant properly moist for the requirements of that particular plant. Furthermore, with the arrangements in accordance herewith, very basic and manual controls can be utilized for feeding the supply line and determining the time intervals of feeding the soil. This is particularly important in underdeveloped countries at this time where it is desirable to increase the quantity of food produced from every portion of land being cultivated.

In its broadest sense, the above is achieved by introducing liquid into a supply line, isolating the liquid into individual metered portions, and then expelling the individual metered portions into the soil and repeating this sequence as often as desired. More particularly, the above is achieved by placing a plurality of small chambers of predetermined size in spaced relationship along a supply line. These chambers have comparatively large outlets which remain closed except when pressure is applied to them. In addition, provision is provided for closing each outlet automatically upon the appropriate metered amount of water having been expelled from each of the chambers regardless of whether or not such action has beem completed in the other of the various chambers along the supply line and regardless of the amount of liquid still flowing through the supply line itself. The pressure for causing this action is provided by the application of compressed air.

Accordingly, it is one object of this invention to provide methods and apparatus for the drip irrigation of land either above or below the surface thereof. In addition, it is a further object of this invention to provide methods and apparatus for the controlled metering of the amounts of water expelled from each outlet of the systems in accordance herewith with that amount of water being predetermined in accordance with the desired characteristics of the soil being irrigated.

In addition, it is a further object of this invention to provide such drip irrigation of metered amounts of water in a controlled sequence of time intervals so that the predetermined metered amounts of water are expelled into the soil being irrigated only when determined by the operator.

Other objects and advantages of this invention will be apparent from the following description, the accompanying drawings and the appended claims.

In the drawings:

FIG. 3 is a sectional view along lines 3—3 of FIG. 2 and showing one embodiment of feeding chamber or pod attached to the supply line of the system, in accordance herewith;

FIG. 4 is the same view as FIG. 3 with the parts shown in different positions of movement thereof;

FIG. 5 is a longitudinal sectional view of apparatus embodying and for practicing this invention and showing a further embodiment of feeding chamber or pod attached to a supply line;

Figure 1:
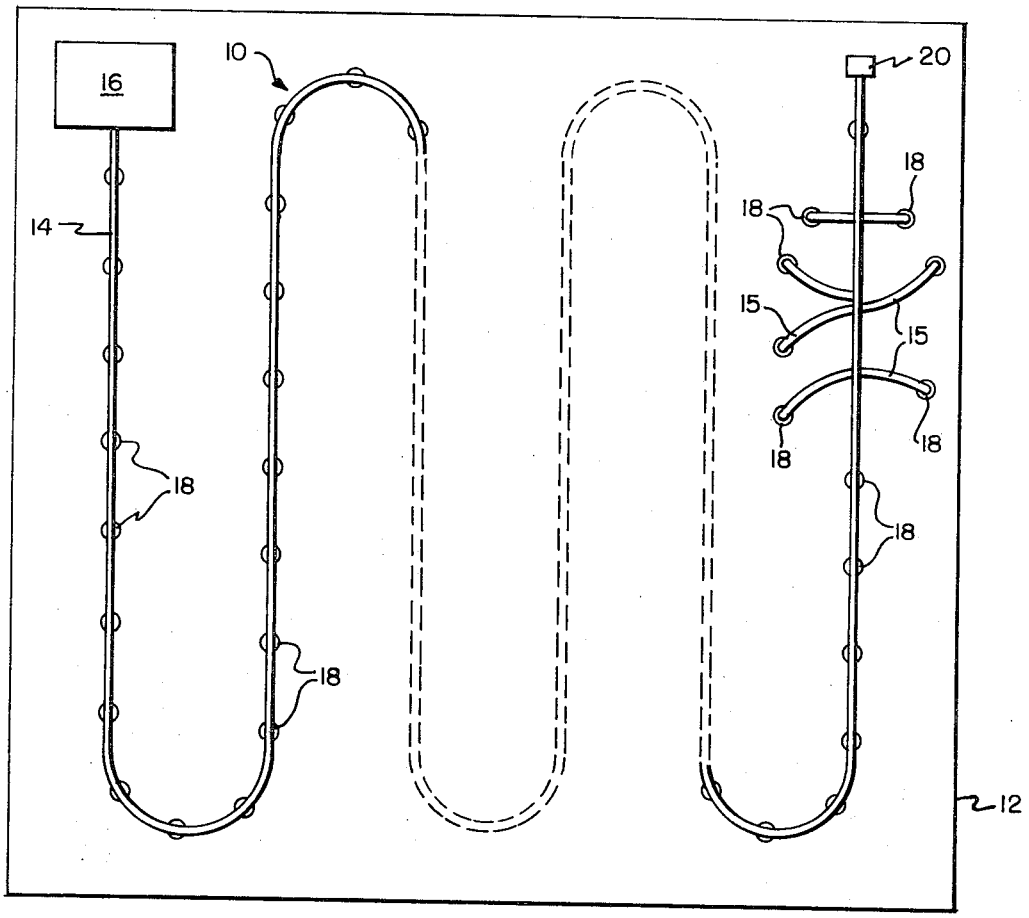
FIG. 1 is a schematic, somewhat diagrammatic indication of a drip irrigation system embodying and for practicing this invention.

Referring to the drawings in which like characters of reference refer to like parts throughout the several views thereof, FIG. 1 illustrates the invention as employed for irrigation of a plot of land with a supply line arranged in a conventional manner for reaching substantially all areas of that plot of land.

In FIG. 1, a drip irrigation system is designated generally as 10, with a supply line 14 arranged in a series of evenly spaced loops in order to cover the entire plot of land 12 to be irrigated. Disposed in equally spaced apart fashion along supply line 14 is a plurality of feeding chambers or pods 18 indicating the positions along supply line 14 at which the soil is fed with a supply of water for irrigation. Supply line 14 begins at a control center 16 which may contain a source of water and/or a source of compressed air, as desired and which will be discussed in detail below.

Control center 16 may contain a conventional air compressor driven in the usual manner by a gasoline engine or an electric motor for supplying a source of compressed air through supply line 14, as desired and which will be discussed in more detail below. Also, it should be understood that it is within the purview of this invention that the source of water supply for line 14 may be simply a container placed at a higher elevation than supply line 14 which can be a manually filled with a measured amount of water for supplying line 14, and that the source of compressed air may be a manually operated conventional foot type compressor for supplying compressed air through line 14.

The end 20 of supply line 14 may have incorporated therein a valve for closing off or opening the end 20 of the line for expelling air therein for the system, in accordance herewith, utilizing alternative feedings of water and compressed air to supply line 14. Alternatively, the system can be arranged so that the end 20 returns to control center 16 for recirculation and for more easy manipulation of the control of the end of the line, all of which will be discussed in more detail below.

Supply line 14 is comprised of any appropriate flexible material including both natural and synthetic resins or any other suitable material. For example, it may be comprised of extruded polyethylene with the supply line having a diameter of approximately 0.75 inches. Holes may be bored at intervals along the supply line for attachment of the supply chambers or pods 18. As will be understood, these holes may be threaded for threaded connection to the individual pods 18. Alternatively, the pods may be heat sealed either directly or through the use of a heat-sealing bonding agent to the supply line at the various holes previously drilled, if the pods and the supply line are comprised of thermoplastic materials and all in well-known manner. If a wider area is to be watered along supply line 14, then secondary supply lines 15 may be connected to line 14 with pods 18 placed at the ends of secondary lines 15. Lines 15 may be more flexible than line 14 in order to allow specific placement adjacent plants being watered. There may be more than one pod 18 connected to lines 15.

Figure 2:
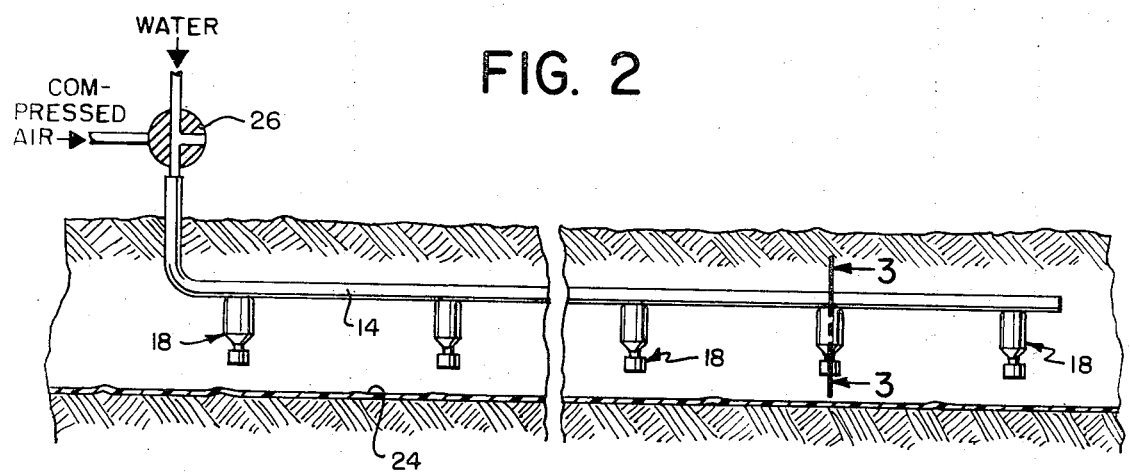
FIG. 2 is an elevational view of one portion of the system of FIG. 1 and showing the arrangements of individual feeding chambers or pods attached to the supply line of the system.

The holes drilled along the supply line may be aproximately 0.5 inches in diameter although the size of the holes will be determined depending on the predetermined size of the metering supply chambers of pods 18 which in turn will depend upon the amount of water to be supplied to the soil being irrigated. As is shown in the FIG. 2 embodiment, the supply pods 18 are disposed to depend downwardly from supply line 14 and preferably the entire system will be placed under the surface 22 of the soil being irrigated. A two-way valve 26 disposed in the control center 16 will alternately supply water or air to supply line 14, as desired.

As will be understood, it may be desirable to lay a V-shaped plastic sheet in the trench prior to installation of the irrigation system supply line 14 to prevent downward seepage of the water expelled into the soil, and in order to increase upward capillary action into the soil adjacent to the roots of the plants being irrigated.

In the embodiment of supply chamber or pod 18 shown in FIG. 3 the metered chamber or container 19 may be of any size desired, depending upon the quantity of water to be fed. Two ounces is considered appropriate for many applications. Pod 18 may be comprised of a variety of natural or synthetic resins as well. Preferably, it will be comprised of a thermoplastic resin such as polyethylene. As can be seen in FIG. 3, supply line 14 in this particular embodiment is extruded to have a substantially flat platform area 31 integral therewith along which openings 30 are formed to provide communication with chamber 19. Pods 18 have threaded openings 33 in the top thereof for insertion of ball valves 34, to be discussed below. Openings 30 and 33 are threaded to join with threaded connecting nipple 28.

As can be seen further in FIG. 3, pod 18 has downwardly convergent walls 36 leading to an outlet 44 defined by an integral neck 42 joined to the walls 36. As can be seen further in FIG. 3, an orifice box 39 is connected to outlet 44 of pod 18 with orifice box 39 having an integral neck 40 threaded to join with the threaded neck 42 of the pod 18. Orifice box 39 defines a chamber 38 providing communication between outlets 44 and 48 of chamber 38. A disc shaped element 46 is disposed in outlet 48 defining an elastic gate or sphincter-like valve therefor, with disc 46 having a downwardly extending annular edge portion 49 cooperating in sealing engagement with upwardly extending curved edge 51 of the walls of orifice box 39. Disc or sphincter-like valve 46 is formed of an elastic, preferably thermoplastic resin, with edge portions 49 thereof being in press-fit engagement with edge 51. Alternatively, they can be heat sealed using a bonding material, all in well-known manner. In this connection it should be noted that the sphincter-like disc or gate is so configured that it remains in its closed non-flexed position as shown in FIG. 3, for example, except in those instances when appropriate pressure is applied behind it. At that time, a sphincteral action takes place allowing water to flow from the pod.

In FIG. 3, elastic sphincter-like valve 46 is shown in its normally closed sealed position. However, the configuration thereof is such that when pressure is applied to the upper surface thereof in a chamber 38, disc 46 will flex to permit water under pressure to flow from chamber 38 in orifice box 39. A float type ball valve 34 is shown in FIG. 3. When water flows into chamber 19 from supply line 14, ball valve 34 floats to the upper portion of chamber 19 away from its seat against outlet 44.

FIG. 4 is a showing of the same view as FIG. 3 of pod 18 but with the parts in different positions. As can be seen, when compressed air is admitted to supply line 14 it flows through passage 32, as indicated schematically with arrows 50 in FIG. 4, forcing the water in chamber 19 out through outlet 44 and into chamber 38. The gradual build-up of pressure behind elastic sphincter-like disc 46 will finally cause disc 46 to flex and release the water from chamber 19. Removal of water from chamber 19 will cause the ball valve 34 to fall to the bottom of chamber 19 and seat in a sealing engagement with the converging wall 36 of pod 18, thus sealing outlet 44 and preventing further application of air pressure into air chamber 38. Upon seating of the ball valve 34, therefore, no further pressure is applied to the top surface of elastic disc 46 and it will close to effectively seal the outlet 48.

With such an arrangement, the quantity of liquid exiting from outlet 48 into the soil being irrigated will be determined by the capacity of chamber 19, which is predetermined, as desired, prior to connection of the pod 18 to the supply line 14. It will be understood in this connection, that a variety of different sized pods 18 may be utilized, depending upon the quantity of water desired to be ejected from each pod 18 in the system.

Figure 6:
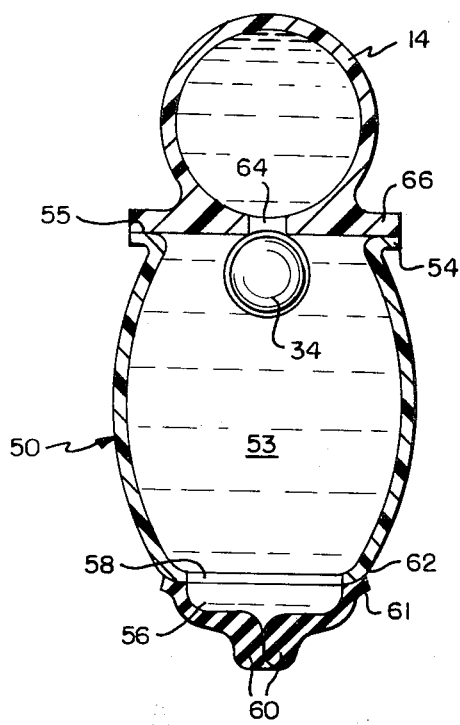
FIG. 6 is a sectional view along lines 6—6 of FIG. 5.

In FIGS. 5 and 6, a further embodiment of metering chamber or pod is shown in the form of a substantially bell shaped pod 50. Preferably, pod 50 is comprised of a thermoplastic resin such as polyethylene. To this end, the pod 50 has an annular edge portion 54 which can be sealed either directly or through the use of a bonding agent to the surface of supply line 14 as at 55. In this embodiment, supply line 14 has a flat integral base portion 66 with an elongated orifice 64 shown providing flow communication between supply line 14 and the chamber 53 of pod 50. Because of its elongated configuration, orifice 64 provides efficient communication between supply line 14 and chamber 53 but it is still narrow enough to prevent float ball valve 34 from passing from chamber 53 into supply line 14, as shown in FIG. 6.

In this embodiment, a disc-shaped elastic sphincter-like gate or valve 60 is shown similar in construction to gate 46 of the FIG. 3 embodiment discussed above. However, gate 60 has an annular edge portion 61 which is sealed at 62 directly to the bottom walls 52 of pod 50. As can be seen in FIG. 5, the generally cup shaped configuration of gate 60 provides a curved seating area in combination with the curved wall 52 for directing the float ball valve 34 into seating engagement with gate 60. As shown in FIG. 6, when water is admitted to supply line 14 and passes through orifice 64 into pod 50, the float 34 floats to the top of chamber 53.

Thereafter, when compressed air is admitted to supply line 14 pressure is applied to the upper surface of the water in chamber 53 forcing the water downwardly which in turn applies pressure to sphincter-like elastic gate 60. When the pressure has risen sufficiently at the upper surface of water in chamber 53, the elastic gate 60 is forced open releasing the liquid in chamber 53 out through outlet 58 thereof. When this happens, because of the curved structure of walls 52 of pod 50, the float valve 34 is caused to follow the downward flow of the water until it seats against the upper surfaces of gate 60 and closes the outlet passage.

It should be understood, that with both of the embodiments of FIGS. 3 and 4 and FIGS. 5 and 6, that the elastic gates provide exit openings for releasing the water into the soil which are large enough to minimize any problem of clogging of the exit orifices with soil particles or granular material that may be present in the soil adjacent to the areas where the gates open. Furthermore, the fact that the water is expelled under comparatively high pressure further minimizes any problem of clogging.

Figure 7:
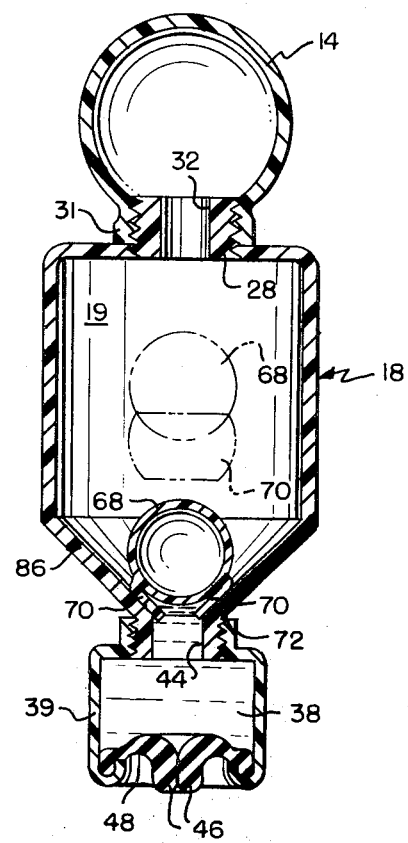
FIG. 7 is a sectional view of apparatus similar to that of FIGS. 3 and 4 but showing a different embodiment of ball valve for the feeding chamber or pod.

In FIG. 7, a pod similar to that shown in FIGS. 3 and 4 is shown. The only difference in this embodiment is the configuration of the floating ball valve 68. As can be seen in FIG. 7, the ball valve 68 has a flexible annular depending portion or skirt 70 which is of a soft pliable material which hangs down from the ball valve 68 proper, as can be seen in phantom lines in the center of cavity 19 of FIG. 7. When ball valve 68 descends to seat, an enhanced sealing action is provided because the air pressure against ball valve 68 serves to compress the depending flexible skirt 70 against the edges of converging walls 36 as shown at 72 in FIG. 7.

Figure 8:
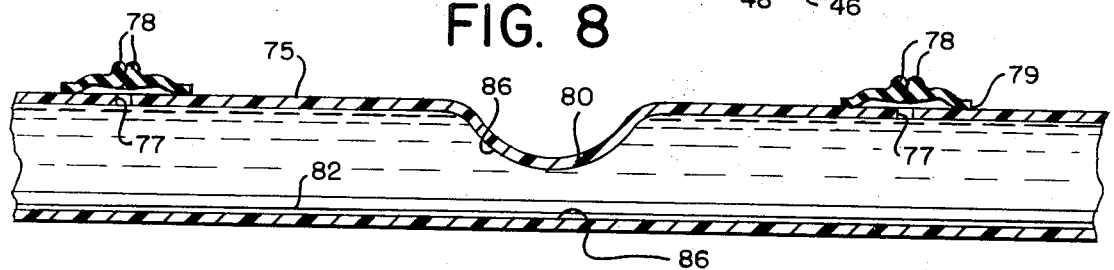
FIG. 8 is a longitudinal sectional view of apparatus showing a further embodiment of this invention with the segregated feeding chamber incorporated entirely within the supply line.

FIG. 8 shows a further embodiment of this invention in which segregated metered portions of water to be expelled are self-contained within supply line 75 itself. In this embodiment, supply line 75 has an integral base portion similar to 66 in FIG. 6 and a plurality of spaced apart indentations or depressions 80 along the upper surface. Between each indentation 80 are one or more bores 77 in the upper wall of supply line 75. Disposed over each bore 77 is an elastic sphincter-like gate 78 of substantially the same disc-like configuration as gate 60 in FIGS. 5 and 6. Again, gate 78 will be comprised of a fairly rigid elastic material effectively sealing bores 77 until a substantial pressure rise takes place behind them. Furthermore, gates 78 are comprised of a thermoplastic material which in this embodiment is sealed to the upper surface of supply line 75 at 79 either by heat sealing directly or through the use of a bonding agent, all in well-known manner. Disposed within supply line 75 is a separate flexible and expandable hose 82 extending along the entire length of supply line 75. In this connection it should be noted that flexible hose 82 may be manufactured entirely separately from supply line 75 and subsequently inserted therein so that failure of either supply line 75 or flexible hose 82 will not require replacement of both parts. As can be seen in FIG. 8, indentations 80 provide a restricted passage 84 at a plurality of spaced apart locations along supply line 75. Generally, for most applications, the indentations will be placed within a range of between about 2–3 feet of each other along supply line 75.

Figure 9:
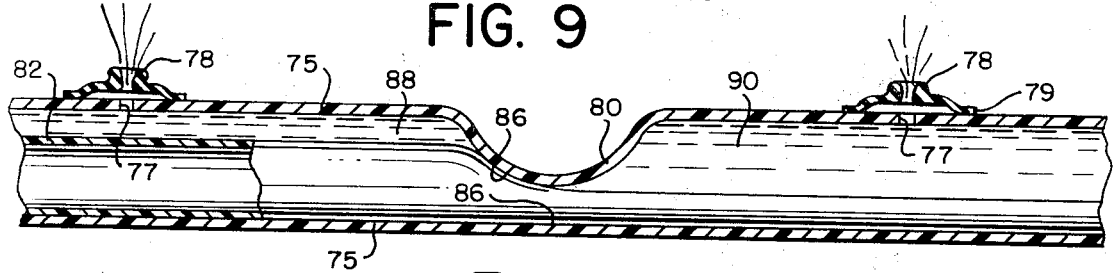
FIG. 9 is the same view as in FIG. 8 except with the parts disposed in a different position of movement.

As can be seen in FIG. 9, when compressed air or water is supplied into flexible and expandable hose 82 in the internal cavity thereof, the flexible hose 82 expands to define a plurality of segregated chambers such as 88 and 90 shown in FIG. 9. This is achieved because the outer surfaces of flexible hose 82 move into a sealing engagement with the inner surfaces of the indentations 80 as at 86 in FIG. 9.

Thus, as compressed air gradually fills and expands flexible hose 82, pressure is applied to the water in the segregated areas such as 88, and as the pressure builds up in chamber 84 of flexible hose 82 therealong, gates 78 are caused to open and release the water from segregated chambers 88 and 90 through orifices 77.

In the embodiment of FIGS. 8 and 9 it will be understood that after this sequence of expelling the water from the plurality of chambers 88 and 90, the compressed air or water in chamber 84 of flexible hose is removed by opening a valve as at 20 in FIG. 1, or otherwise. Subsequently, water will again be supplied to supply line 75 to fill up the areas therein comprising the previously segregated chambers such as 88 and 90. Subsequent to this procedure, compressed air will again be supplied in sequence to the cavity 84 in flexible hose 82. This sequence of procedures can be in a timed fashion in order to supply an appropriate amount of irrigation water to the area as desired and depending upon the particular plants being irrigated.

In any of the embodiments of the invention a bleeder valve may be provided as at 20 in FIG. 1 to facilitate the filling and emptying of the system in a sequence of operations.

Figure 10:
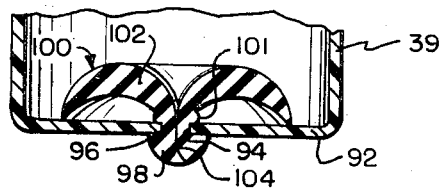
FIG. 10 is a vertical sectional view of a further embodiment of elastic gate or valve, embodying further aspects of the invention.

Referring now to FIG. 10, a further embodiment of elastic gate valve is shown and designated generally at 100. valve 100 is designed to be mechanically press-fit into position. Thus, there is no need for facilities or materials required to seal this valve into place. Valve 100 is comprised of an annular neck portion 96 with a base button portion 98 integral therewith. Also integral with neck 96 is an annular locking abutment portion 101. Immediately above abutment 101 is wing portion 102 formed to take the position shown in FIG. 10 after insertion into orifice 94 in the base of orifice box 39.

Prior to insertion into orifice 94, wings 102 are forced together to form an elongated form appropriate for insertion through orifice 94. Thereafter, valve 100 because of its elastic characteristics is pressed into and through orifice 94 until abutment 101 seats on the upper surface of base 92 or orifice box 39. Button portion 98 prevents further insertion of valve 100 through orifice 94. Wing portion 102 will spread to the approximate position shown in FIG. 10 because of its elastic characteristics. Valve 100 has a central opening or passage 104 therethrough. Passage 104 will normally be closed.

Upon water being supplied to pod chamber 19 (FIG. 3) it will fall into chamber 38 and the weight thereof will cause wing portion 102 to further spread into sealing engagement with upper surface 106 of base 92. Upon subsequent application of compressed air into supply line 14 the increased pressure will cause the walls of passage 104 to expand sufficiently to allow water in pod 18 to be expelled. When this happens, pressure upon valve 100 is relieved allowing the walls of passage 104 to again retract into sealing engagement. In this connection, it should be understood that neck 96 will be of a size in relation to orifice 94 to allow this expansion and contraction of the walls of passage 104.

If sand or gravel should pass into chamber 98 it will fall harmlessly outside the spread extent of wing portion 102 as shown as 104 in FIG. 10.

Whereas specific embodiments of segregated metering chambers have been shown, it should be understood that it is within the purview of this invention to provide other forms of metering chambers as long as they can be configured to supply predetermined metered amounts of water for each one of the pods or chambers and they can be appropriately segregated from the water supply in a sequence of operations in which pressure is being applied for delivering the predetermined metered amounts of water in spaced apart fashion along the supply line.

Thus, it can be seen that systems are provided, in accordance herewith, utilizing parts which are relatively easily manufactured at comparatively low cost. Moreover, various parts can be easily combined together in relatively rustic circumstances such as a farm shop without the need of expensive assembling equipment. Furthermore, because of the particular arrangement herein, no expensive land leveling preparation is necessary since the systems, in accordance herewith, operate to meter the irrigating water along the supply lines therefor in relatively uniform amounts at every location along the supply line regardless of the elevation of any particular portion of the supply line or its distance from the upstream end of the pipe.

In addition, the arrangements herein are such that they can be operated in remote undeveloped areas where no mechanical power sources are available. That is, because of the simplified arrangements herein, a foot powered compressor is sufficient to supply the required compressed air to the supply line for expelling the various metering pods and because of the pressure expelling nature of the arrangements herein, comparatively larger orifices can be used thus eliminating the need for expensive valving arrangements for avoiding clogging of the orifices of the supply line. Also, because the water is supplied in predetermined metered amounts and can be supplied in sub-surface fashion, the systems herein are particularly frugal with the use of water which is particularly appropriate in semi-arid areas.

The systems and methods herein are particularly advantageous for use with conventional irrigation techniques. For example, soluble nutrients, systemic insecticides and liquid fumigants may be added to the water supply. This is advantageous with the systems in accordance herewith because of the predetermined metering approach. That is, quantities of the particular additions can be accurately predicted since the quantity of water to be expelled is known in each sequence. Moreover, wicks can be utilized in a conventional manner with the systems in accordance herewith with the wicks being placed in the soil adjacent to the orifices from which the irrigating water is expelled. These wicks serve two purposes including holding the water in suspension and leading the water in the direction of the root systems being fed. Usually, these wicks will be comprised of an absorbing type material such as Bentonite clay or certain absorbent type synthetic products similar to Bentonite.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. In apparatus for irrigating land and having a source of water, the combination which comprises a plurality of spaced apart metering chambers with each of said chambers having at least one exit orifice; means providing flow communication between said source and each of said chambers for supplying said chambers with water; means in said flow communication means for supplying a gas under pressure to said chambers for expelling water therefrom; and valve means in each of said chambers for closing said exit orifices upon the emptying of said chambers in response to gas from said pressurized gas supply means.

2. Apparatus as recited in claim 1, in which each of said valve means includes a pressurized gas responsive elastic gate normally flexed to close said exit orifices and which flex in sphincteral fashion in response to pressurized gas being supplied to said flow communication means for emptying said chambers.

3. In apparatus for irrigating land and having a source of water, and a source of gas under pressure; the combination which comprises means providing flow communication between said sources of water and pressurized gas and said land; first valve means for alternative connection thereof to said sources of water and pressurized gas; means for isolating metered amounts of water along said flow communication means when water is supplied thereto; and a plurality of second valve means for draining said isolated metered amounts of water in response to said flow communication means being connected to said source of pressurized gas.

4. In apparatus for irrigating land and having a source of water, and a source of pressure fluid; the combination which comprises a first elongated flexible tube providing flow communication between said source of water and said land; a plurality of spaced apart depressions disposed along said first tube defining metering chambers; a separate second elongated flexible expandable tube in said first tube and connected to said source of pressure fluid; first valve means for the alternative connection of said first and second tubes to said sources of water and pressure fluid respectively; a second valve means in each of said metering chambers for draining said chambers; whereby said second tube expands in response to pressure fluid supplied thereto and coacts with said depressions to segregate said chambers and expel water through said second valve means.

5. In apparatus for irrigating land and having a source of water, the combination which comprises a plurality of spaced apart metering chambers with each of said chambers having at least one exit orifice; means providing flow communication between said source and each of said chambers for supplying said chambers with water; said chambers being in the form of segregated pods depending from said flow communication means; means in said flow communication means for supplying pressure fluid to said chambers for expelling water therefrom; valve means in each of said chambers for closing said exit orifices upon the emptying of said chambers in response to pressure fluid from said pressure fluid supply means; each of said valve means including a pressure fluid responsive elastic gate normally flexed to close said exit orifices and which flex in sphincteral fashion in response to fluid pressure being supplied to said flow communication means for emptying said chambers of water; and in which said valve means also includes a floating ball valve in each of said chambers which closes said exit orifices in response to emptying said chambers of water.

6. In apparatus for irrigating land and having a source of water; the combination which comprises a plurality of spaced apart metering chambers with each of said chambers having at least one exit orifice; a first elongated flexible tube connected to said source and having a plurality of spaced apart depressions disposed therealong, said depressions defining said plurality of chambers; a separate elongated flexible and expandable second tube connected to a source of pressure fluid and disposed in said first tube; said second tube being expandable in response to pressure fluid supplied thereto for coacting with said depressions to segregate said chambers and expel water therefrom; and valve means in each of said chambers for closing said exit orifices upon the emptying of said chambers in response to pressure fluid from said pressure fluid supply means.

7. Apparatus as recited in claim 3 in which said isolating means is a plurality of segregated pods defining metering chambers depending from said flow communication means and having an exit orifice thereon; and in which each of said second valve means includes a pressurized gas responsive elastic gate normally flexed to close said orifices and which flex in sphincteral fashion in response to pressurized gas being supplied to said flow communication means, and in which each of said valve means also includes a floating ball valve in each of said chambers which closes said exit orifices in response to emptying said chambers of water.

8. Apparatus as recited in claim 6, in which each of said valve means includes a pressure fluid responsive elastic gate normally flexed to close said exit orifices and which flex in sphincteral fashion in response to expansion of said second tube for emptying said chambers.

9. In a method for irrigating a plot of land, the steps which comprise placing a supply line over said land, filling said supply line with water; isolating the water in said supply line into substantially equal spaced apart portions therealong; and expelling said isolated portions from said supply line by applying pressure to said supply line and said isolated portions.

10. A method as recited in claim 9 in which said expelling step is carried by displacement of said isolated portions from said supply line by a segregated body of expanding pressure fluid.

11. A method as recited in claim 10 in which said isolating step is carried out by isolating each of said portions adjacent at least one exit orifice defined by a flexible gate disposed in a non-flexed closed position; and in which said expelling step is carried out by admitting pressurized gas to said supply line under sufficient pressure to flex said gates.

* * * * *